US008944385B2

(12) United States Patent
Harmann et al.

(10) Patent No.: US 8,944,385 B2
(45) Date of Patent: Feb. 3, 2015

(54) DEVICE FOR REDUCING THE IMPACT ON A SURFACE SECTION BY POSITIVELY CHARGED IONS, AND ION ACCELELERATOR ARRANGEMENT

(75) Inventors: Hans-Peter Harmann, Lindau (DE); Norbert Koch, Ulm (DE); Guenter Kornfeld, Elchingen (DE)

(73) Assignee: Thales Electronic Systems GmbH, Ulm (DE)

( * ) Notice: Subject to any disclaimer, the term of this patent is extended or adjusted under 35 U.S.C. 154(b) by 1300 days.

(21) Appl. No.: 12/733,625

(22) PCT Filed: Sep. 12, 2008

(86) PCT No.: PCT/EP2008/062152
§ 371 (c)(1),
(2), (4) Date: Nov. 29, 2010

(87) PCT Pub. No.: WO2009/037197
PCT Pub. Date: Mar. 26, 2009

(65) Prior Publication Data
US 2011/0080085 A1    Apr. 7, 2011

(30) Foreign Application Priority Data
Sep. 14, 2007 (DE) .............................. 102007043955

(51) Int. Cl.
*B64G 1/52* (2006.01)
*F03H 1/00* (2006.01)
*B64G 1/40* (2006.01)

(52) U.S. Cl.
CPC .............. *F03H 1/0062* (2013.01); *B64G 1/405* (2013.01)
USPC ........................ 244/171.7; 60/202; 244/171.1

(58) Field of Classification Search
CPC ........ B64G 1/54; B64G 1/405; F03H 1/0037; F03H 1/0062; F03H 1/0068; F03H 1/0075; F03H 1/0056; H01J 21/02; H01J 27/143; H01J 27/146
USPC ........................ 244/171.7, 205, 171.1; 60/202
See application file for complete search history.

(56) References Cited

U.S. PATENT DOCUMENTS 3,983,695 A * 10/1976 Power .............................. 60/202
6,075,321 A *  6/2000 Hruby ....................... 315/111.91
(Continued)

FOREIGN PATENT DOCUMENTS

DE          699 19 675          9/2005
DE          697 34 062          6/2006
(Continued)

OTHER PUBLICATIONS

A. Lucca Fabris et al., "Ion Velocimetry Measurements and Particle-In-Cell Simulation of a Xylindrical Cusped Plasma Accelerator", IEPC-2013-458. Presented at the 33$^{rd}$ International Electric Propulsion Confrence, Washington DC, Oct. 6-10, 2013.*
(Continued)

*Primary Examiner* — Benjamin P Lee
*Assistant Examiner* — Alexander V Giczy
(74) *Attorney, Agent, or Firm* — Collard & Roe, P.C.

(57) ABSTRACT

The invention relates to a surface section that is exposed to an ion flow, in particular for a drive arrangement in a spacecraft, comprising an electrostatic ion accelerator arrangement. According to the invention, in order to reduce erosion, an intermediate potential energy surface is provided, the surface being advantageous in that it allows a magnetic field that is essentially parallel to the surface section to be formed.

11 Claims, 1 Drawing Sheet

(56) References Cited

U.S. PATENT DOCUMENTS

Figure 1:
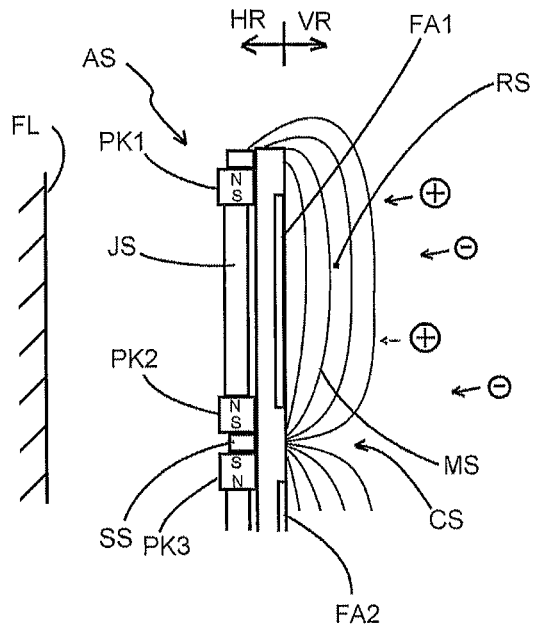

| | | | |
|---|---|---|---|
| 6,089,186 A | 7/2000 | Kisoda et al. | |
| 6,158,209 A | 12/2000 | Latischev et al. | |
| 6,260,808 B1 | 7/2001 | Bodeau et al. | |
| 6,507,142 B1 * | 1/2003 | Tilley et al. | 313/239 |
| 7,484,691 B2 * | 2/2009 | Kinstler | 244/171.7 |
| 2002/0014845 A1 * | 2/2002 | Raitses et al. | 315/111.81 |
| 2003/0230961 A1 * | 12/2003 | Madocks | 313/359.1 |
| 2004/0164205 A1 * | 8/2004 | Kellberg | 244/172 |
| 2006/0169931 A1 | 8/2006 | Kinstler | |

FOREIGN PATENT DOCUMENTS

| | | |
|---|---|---|
| JP | 04-218498 | 8/1992 |
| JP | 2005-317698 | 11/2005 |

OTHER PUBLICATIONS

International Search Report.

* cited by examiner

DEVICE FOR REDUCING THE IMPACT ON A SURFACE SECTION BY POSITIVELY CHARGED IONS, AND ION ACCELELERATOR ARRANGEMENT

CROSS REFERENCE TO RELATED APPLICATIONS

This application is the National Stage of PCT/EP2008/062152 filed on Sep. 12, 2008, which claims priority under 35 U.S.C. §119 of German Application No. 10 2007 043 955.7 filed on Sep. 14, 2007. The international application under PCT article 21(2) was not published in English.

The invention relates to a device for reducing the impact on a surface section by positively charged ions, as well as to an ion accelerator arrangement, particularly as a drive arrangement in a spacecraft.

For drive arrangements in spacecraft, such as, in particular, satellites or space probes, not only chemical drives and pulsed thermal drives, but also electrostatic drives are known. The latter particularly utilize a high voltage, in order to accelerate positively charged ions of a working gas ionized in an ionization chamber in the static high-voltage field and to eject them through an opening in the plasma chamber as a plasma beam. In this connection, the spacecraft is accelerated in the opposite direction according to the recoil principle. Preferably, a noble gas such as, in particular, xenon serves as the working gas. Such electrostatic drives are particularly advantageous because of their high specific impulse.

In the operation of such arrangements, it has been shown that the surface of the ion accelerator arrangement or of the spacecraft that surrounds the beam exit opening and faces in the direction of the ejected plasma beam is eroded. Damage caused by ions can also occur on other surface regions, particularly those having sensitive surfaces or components, whereby such damage can be particularly serious in the case of spacecraft, without any possibility of repair.

The invention is based on the task of reducing damage to surfaces impacted by ions, particularly erosion of a surface region that surrounds the exit opening.

Solutions according to the invention are described in the independent claims. The dependent claims contain advantageous embodiments and further developments of the invention.

By means of the magnetic field having a magnetic field direction predominantly parallel to the surface section, in a direction of the surface normal line of the surface section that lies in front of this spatial region, a significant reduction in the ion impact on the surface section is surprisingly achieved, although the effect of the magnetic field on the positively charged ions is only slight. The effect of the magnetic field is based, instead, on the fact that the positive charge of the surface section that results from the initial impact on the surface section leads to an electrical field that repels further ions, and that electrons that are accelerated in the direction of the surface section by means of such a field are deflected and kept away from the surface section, because of their low mass and high velocity. As a result, the positive charge of the surface section and the resulting electrical field that repels ions are maintained.

The surface section preferably has an electrically non-conductive surface or is separated, at high ohms, from conductive surfaces of a total device, for example a spacecraft, that contains the surface section. The surface section can advantageously be part of an electrical device, particularly a solar cell array of a spacecraft. The magnetic field preferably has at least one cusp structure, which acts reflectively on electrons that are moving along the magnetic field lines, by means of a high field gradient.

In an ion acceleration arrangement, it was surprisingly shown that a great reduction in surface erosion is achieved by means of a surface that surrounds the beam exit opening and faces the ejected plasma beam, which is referred to hereinafter and in the claims as a shielding surface, which, in operation of the ion acceleration arrangement, lies spatially between the ejected plasma beam, particularly the plume region and parts that lie at mass potential, particularly of a spacecraft, and electrically at a potential that is separated from the mass potential of the spacecraft.

An embodiment in which the shielding surface, in operation of the ion accelerator arrangement, i.e. during ejection of the plasma beam from the beam exit opening, lies at a sliding potential with regard to the mass potential of the spacecraft is particularly advantageous. This can particularly take place by means of an electrically non-conductive embodiment of the shielding surface and/or by means of electrical insulation of the shielding surface relative to the mass potential of the spacecraft. In drive operation, a potential that is separated from the mass potential then automatically occurs on the shielding surface.

The invention makes use of the recognition that the erosion observed is decisively attributable to the fact that in the ejected plasma beam, in the beam direction, the plume potential for positively charged ions lies higher than the mass potential of the spacecraft, and therefore ions that are generated or present in the plume region are deflected out of the plasma beam and accelerated in the direction of the mass potential of the spacecraft, and in this connection preferably impact in the region of the shielding surface, in the area that surrounds the beam exit opening. The plume potential itself cannot be changed in targeted manner. The gas density decreases rapidly with an increasing distance from the center of the plume region. A typical expanse of the plume region in the beam direction after the beam exit opening of the ionization chamber lies in the magnitude of 10 cm-40 cm.

By means of the potential separation of the shielding surface from the mass potential, a potential on the shielding surface that lies between the plume potential and the lower mass potential and shields the mass potential for the ions of the ejected plasma beam rapidly occurs, particularly by means of a sliding potential, in drive operation.

In another embodiment, the shielding surface can be electrically conductive and be set to a shielding potential that is offset relative to the mass potential, by a defined voltage.

In a particularly advantageous embodiment, the magnetic field, which is predominantly parallel to the surface region, can make a transition into a cusp structure at the beam exit opening, whereby the field direction runs predominantly perpendicular to the beam direction of the plasma beam at the cusp structure, and a higher field gradient than over the aforementioned surface region is present. The cusp structure surrounds the beam axis in ring shape and lies radially within the lateral delimitation of the chamber wall. The cusp structure can particularly run toward a soft-magnetic pole shoe of a magnet arrangement. It is advantageous if the cusp structure is offset, relative to the magnetic field region, with a predominantly parallel progression relative to the surface region, in the direction of a potential gradient for electrons between a cathode and an anode disposed in the ionization chamber. The cusp structure acts to reflect electrons that move toward the chamber wall along the magnetic field lines.

In usual manner, a cathode electrode is advantageously disposed outside the plasma chamber, offset laterally with regard to the beam exit opening. An anode arrangement that lies at high voltage relative to the cathode electrode is disposed at the foot of the ionization chamber. The cathode electrode emits electrons that serve as primary electrons for ionization of the working gas and for neutralization of the ejected plasma beam. The cathode electrode is advantageously disposed to lie farther on the outside than the shielding surface, radially with reference to the center longitudinal axis, or at least a part of the shielding surface lies between the cathode electrode and the beam exit opening in the radial direction. In this connection, the electrons moved in the direction of the beam exit opening and the plasma beam from the cathode electrode, under the effect of the high voltage, cross a spatial region between the shielding surface and the ejected plasma beam. Advantageously, the ion accelerator arrangement contains a magnet arrangement to generate a magnetic field, which demonstrates a curved magnetic field progression with a predominantly parallel field component relative to the shielding surface in the spatial region between the shielding surface and the plasma beam. In this way, electrons are advantageously held back from moving toward the shielding surface, to a great extent.

The shielding surface can advantageously be structured to be widened in funnel shape away from the spacecraft, in at least its predominant surface proportion. The shielding surface can partly be formed by the surface of a pole shoe arrangement in the region of the beam exit opening.

The shielding surface advantageously consists of a material that is resistant to erosion by means of ion sputtering, such as ceramic or graphite, for example. A sputter-resistant shielding surface can particularly be formed also by means of a coating of sputter-resistant material onto a carrier body composed of a less sputter-resistant material.

The invention will be illustrated in greater detail in the following, using preferred exemplary embodiments and making reference to the figures.

Figure 2:
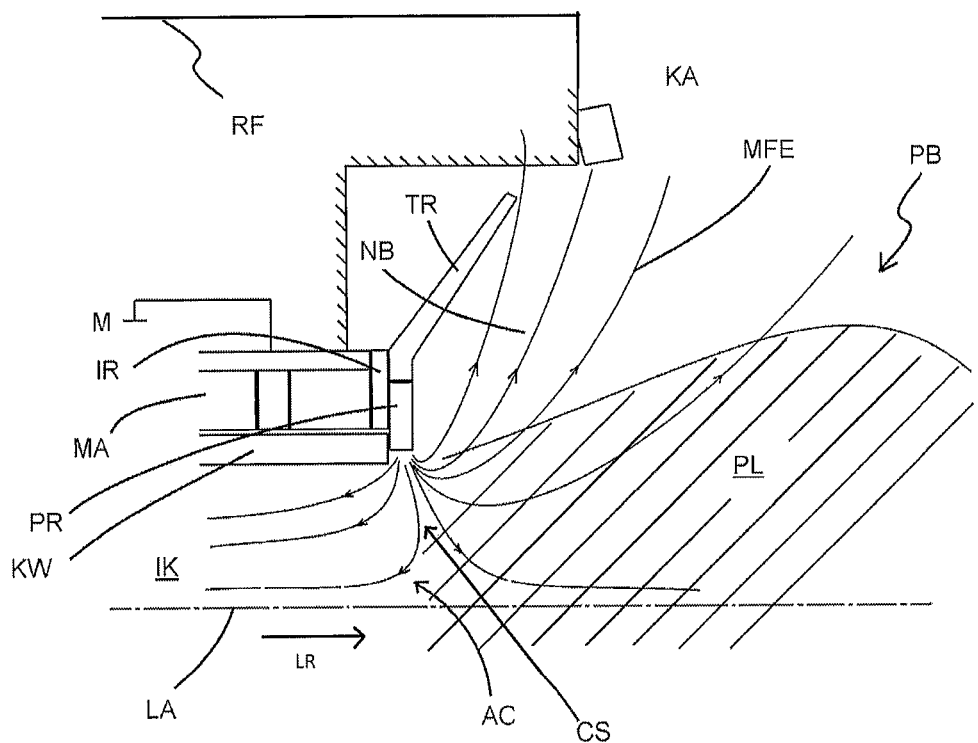

FIG. 1 a general device for protecting a surface section,

FIG. 2 a detail of an ion accelerator arrangement.

In FIG. 1, a surface section FA1 is assumed, which can particularly be a photovoltaically active surface of a solar cell array of a spacecraft. Positively charged ions from the surrounding space are directed at the surface section FA1, in their movement direction, particularly by means of a potential gradient for ions in the direction of a conductive surface FL at mass potential of the spacecraft, which lies behind the surface section. The half-space VR on a side of the surface section FA1 that is not covered to prevent ion impact shall be referred to as lying in front of the surface section, while the half-space HR on the opposite side, from which side the surface section is extensively shaded by means of a housing, a carrier arrangement, or by means of the spacecraft itself, shall be referred to as lying behind the surface section FA1.

A magnet arrangement AS, which preferably contains permanent magnet bodies PK, is disposed at the surface section FA1 and generates a magnetic field MS having a field direction predominantly parallel to the surface section in the spatial region RS, in the direction of the surface normal line of the surface section FA in front of the surface section, in other words the field lines are inclined by more than 45.degree. relative to the surface normal line and by less than 45.degree. relative to the surface-parallel direction. The magnet arrangement contains permanent magnet bodies PK1, PK2 in the example shown, behind the surface section, which are spaced apart, parallel to the plane of the surface section, with the same pole orientation, and are connected by means of a soft-magnetic yoke JS. Another partial magnet arrangement similar to PK1, PK2, JS, behind an adjacent surface section FA2, is indicated by a permanent magnet body PK3, whereby the pole orientation of the additional partial magnet arrangement is set opposite to that of the first partial magnet arrangement PK1, PK2, JS, so that the same magnet poles S stand opposite one another in the permanent magnet bodies PK2, PK3. A soft-magnetic pole shoe SS is inserted between the permanent magnet bodies PK2, PK3. At the pole shoe SS, the magnetic field has a cusp structure in the front half-space VR, with a particularly strong field gradient. Another pole shoe SE can be disposed at the permanent magnet PK1.

If, proceeding from an electrically neutral surface of the surface section FA1, ions and electrons are directed toward the surface section FA1 in terms of their movement direction, the positively charged ions are hardly influenced by the magnetic field and impact the surface of the surface section FA1 and charge it positively, so that an electrical field that acts to repel additional ions is rapidly built up. Electrons that are coming from the half-space VR in the direction of the surface section FA1 and/or are accelerated in the direction of the surface section FA1 by means of the positively charged surface are forced onto circular or spiral-shaped tracks by the magnetic field, because of their mass, and can drift along these toward the permanent magnet body PK1 or toward the cusp structure at the pole shoe SS, where they are predominantly reflected because of the strong field gradient. Because of the blocking effect of the magnetic field for electrons, the repelling field is maintained on the surface of the surface section FA1, which is preferably electrically non-conductive or at least separated, at high ohms, from other conductive parts, such as the surface FL.

In particular, a region in front of the surface section shall be considered as a spatial region RS in front of the surface section FA1, the expanse of which, in the direction of the surface normal line, is less than the distance between the poles or pole shoes of the magnet arrangement that act toward the outside, for example the pole shoes SE and SS.

FIG. 2, as a sectional representation, having a section plane that contains the beam axis of a plasma beam, shows a schematic detail of an ion accelerator arrangement in a spacecraft RF.

An ionization chamber IK having a center longitudinal axis LA advantageously possesses a cross-section that is circular around the center longitudinal axis, and is delimited, crosswise to the center longitudinal axis, by means of a preferably dielectric chamber wall KW. On the side of the chamber wall KW that faces radially away from the ionization chamber, a magnet arrangement MA is disposed, which surrounds the ionization chamber IK and generates a magnetic field in it. The ionization chamber IK is open on one side, in the longitudinal direction LR, with a beam exit opening AO through which positively charged ions generated under the influence of an electrostatic field, by means of ionization of a working gas in the ionization chamber IK, are ejected in the longitudinal direction, as a plasma beam PB.

Part of the magnet arrangement and/or other parts of the ion accelerator arrangement or conductive parts of the spacecraft lie at a mass potential M of the spacecraft. A cathode arrangement KA that is disposed outside of the ionization chamber, offset laterally relative to the beam exit opening AO, typically also lies at mass potential. An anode arrangement disposed at the foot of the ionization chamber, opposite the beam exit opening, not shown in FIG. 2, lies at a high voltage on the magnitude of 1 kV relative to the mass potential.

In the region of the plasma beam that lies after the beam exit opening in the movement direction of the plasma beam, which is referred to as the plume region PL, a plume potential is present that typically lies between 20 V and 100 V higher for the positively charged ions than the mass potential, so that a potential gradient in the direction of the parts that lie at mass potential results for the ions from the plume region, and ions are accelerated in the direction of the mass potential. The expanse of the plume region, in the beam direction, after the beam exit opening, typically lies between 10 cm and 40 cm.

In the example shown, a pole shoe PR is provided at the beam exit opening AO, surrounding it in ring shape. The ring-shaped pole shoe PR typically consists of iron. The pole shoe PR is insulated with regard to the parts of the magnet arrangement that lie at mass potential and/or other parts that lie at mass potential by means of an insulating body IR. A funnel-shaped body TR, which widens in the longitudinal direction LR or toward the beam direction of the plasma beam, respectively, and which can form a part of the shielding surface, follows the ring-shaped pole shoe body PR which can also form a part of the shielding surface. The funnel-shaped body TR can consist of metal that is not soft magnetic and does not influence the magnetic field, or of a dielectric.

The cathode arrangement lies outside the surface region of the funnel-shaped body TR, in the radial direction, and is advantageously disposed offset relative to the funnel-shaped body in the longitudinal direction LR.

If it is assumed, when the ion acceleration arrangement is turned on, that the pole shoe body PR and the funnel-shaped body TR are situated at or close to mass potential, ions are accelerated out of the plume region PL in the direction of the parts that lie at mass potential, and impact the surfaces of pole shoe body PR and funnel-shaped body TR that face the plume region, and charge these bodies up electrostatically, or, in the case of an embodiment of the funnel-shaped body TR as a dielectric body, they charge up its surface that faces the plume region PL. In this connection, these bodies or their surface, respectively, are raised to an intermediate potential that lies above mass potential. The potential gradient for ions from the plume region PL, which only still see this intermediate potential, is thereby significantly reduced, and an equilibrium state without any or with only a slight ion stream from the plume region PL in the direction of the bodies PR, TR occurs.

A remaining residual stream of ions from the plume region PL to the bodies PR, TR can particularly result from the fact that electrons also impact the bodies PR, TR, particularly electrons that are emitted from a cathode arrangement KA that is laterally offset relative to the exit opening. The cathode arrangement KA supplies primary electrons for ionization of the working gas in the ionization chamber IK, and serves as a neutralizer for the ejected plasma beam PB.

In order to keep a stream of electrons onto the bodies PR, TR low, it is provided that a magnetic field MFE generated by the magnet arrangement outside the ionization chamber IK, into a spatial region between the plume region and the bodies PR, TR, particularly a region NB close to the surfaces of the bodies PR TR, demonstrates a progression of the magnetic field lines that is directed predominantly parallel to the surfaces. In this connection, a predominantly parallel progression is to be understood to mean that for the predominant (>50%) surface regions of the surfaces of the bodies PR, TR, in the region NB, in the direction of the surface normal lines above these surface regions, the direction of the curved magnetic field lines runs more parallel to the surface than perpendicular to it. Electrons are then guided along the magnetic field lines predominantly parallel to the surface, at a distance from it, without impacting the surface. Ions remain essentially uninfluenced by the magnetic field, because of their great mass and low speed.

The magnetic field makes a transition, from the region NE having a predominantly parallel progression relative to the surface region of the carrier body TR, into a cusp structure CS at the beam exit opening of the ionization chamber, in which the field direction of the magnetic field runs predominantly radially, and a high radial field gradient is present. The radial field component at the cusp structure is opposite to the radial field component in the region NB, so that the field lines between the region NB and the cusp structure undergo a radial reversal of direction. Electrons emitted by the cathode arrangement are kept away from the surface of the funnel-shaped body in the region NB, by means of the magnetic field, and are guided in the direction of the plume region PL or the ionization chamber, respectively, and there, particularly, to the cusp structure, where they are held for a long dwell time because of the effect of the cusp structure. The effect of the cusp structure in the case of such an ion accelerator arrangement is known from known spacecraft with electrostatic drives.

The funnel-shaped body TR advantageously consists of a non-magnetizable metal having good heat conductivity, and is connected with the pole shoe body so as to conduct heat well, and as a result, lost heat that occurs at the pole shoe is advantageously conducted away quickly and can be radiated off into the surrounding space, by way of the significantly larger surface of the funnel-shaped body.

Pole shoe body PR and/or funnel-shaped body TR can advantageously be provided with a coating such as, in particular, graphite or ceramic, which demonstrate a greater sputter resistance with regard to the materials of these bodies.

The characteristics indicated above and in the claims, as well as those that can be derived from the figures, can advantageously be implemented both individually and in various combinations. The invention is not restricted to the exemplary embodiments described, but rather can be modified in many different ways, within the scope of the actions of a person skilled in the art.

The invention claimed is:

1. A spacecraft having a mass potential and comprising:
   first outside surfaces lying at the mass potential; and
   an ion accelerator arrangement comprising:
      an ionization chamber having a beam exit opening and generating ions from a working gas introduced into the ionization chamber;
      an electrode arrangement configured to electrostatically accelerate the generated ions via a static high voltage, to electrostatically eject from the beam exit opening the generated ions as a plasma beam, and to supply electrons to the ionization chamber for the ionization in the ionization chamber; and
      a shielding surface laterally offset relative to the beam exit opening, surrounding the beam exit opening, and facing the ejected plasma beam during operation of the ion acceleration arrangement, said shielding surface having a funnel-shaped body with a smooth surface facing the ejected plasma beam, wherein said funnel-shaped body consists of metal that is not soft magnetic and does not influence a magnetic field, or of a dielectric;
   wherein the shielding surface lies spatially between the ejected plasma beam and the first outside surfaces;
   wherein the shielding surface lies electrically at a potential separated from the mass potential of the spacecraft; and
   wherein the ion accelerator arrangement reduces impact of positively charged ions of the ejected plasma beam on a surface section of the spacecraft.

2. The spacecraft according to claim 1, wherein the shielding surface is at least partly electrically non-conductive.

3. The spacecraft according to claim 1, wherein the shielding surface is electrically insulated with regard to a mass potential of the ion accelerator arrangement.

4. The spacecraft according to claim 1, wherein the shielding surface lies at sliding potential in a drive operation of the spacecraft.

5. The spacecraft according to claim 1, wherein the shielding surface is offset, relative to a mass potential of the ion accelerator arrangement, by a defined voltage, in a drive operation of the spacecraft.

6. The spacecraft according to claim 1, wherein the electrode arrangement comprises a cathode electrode disposed outside the ionization chamber and laterally offset relative to the beam exit opening.

7. The spacecraft according to claim 6, wherein the shielding surface runs in a radial direction between the cathode electrode and the beam exit opening.

8. The spacecraft according to claim 1, further comprising a magnet arrangement generating a magnetic field having a progression predominantly parallel to the shielding surface in a spatial region between the shielding surface and a spatial region of the ejected plasma beam.

9. The spacecraft according to claim 8, wherein the magnetic field forms a cusp structure between a center longitudinal axis of the ionization chamber and an edge of the beam exit opening, and
wherein the cusp structure has a predominantly radial magnetic field progression.

10. The spacecraft according to claim 1, wherein the shielding surface comprises
a carrier body having a first sputter-resistance, and
a coating on the carrier body having a second sputter-resistance, the second sputter-resistance being greater than the first sputter-resistance.

11. The spacecraft according to claim 1, wherein a beam direction of the plasma beam is directed away from the spacecraft, and
wherein the ion accelerator arrangement operates as a drive device for the spacecraft.

* * * * *